April 8, 1924.
K. B. HARVEY
1,489,434
POWER TESTING DEVICE FOR MOTOR VEHICLES
Filed Aug. 1, 1921
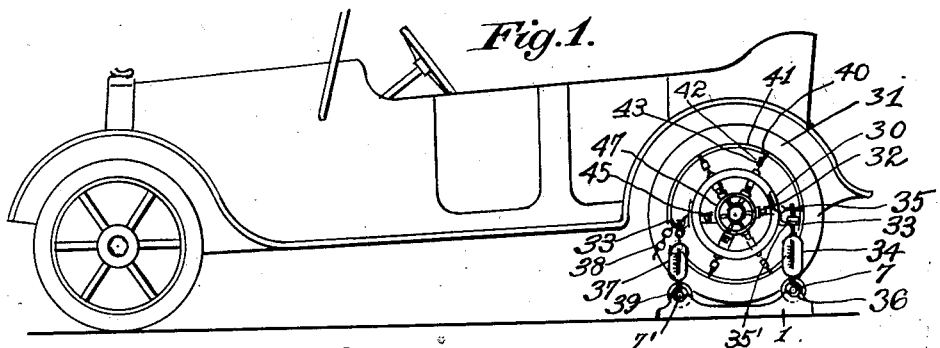
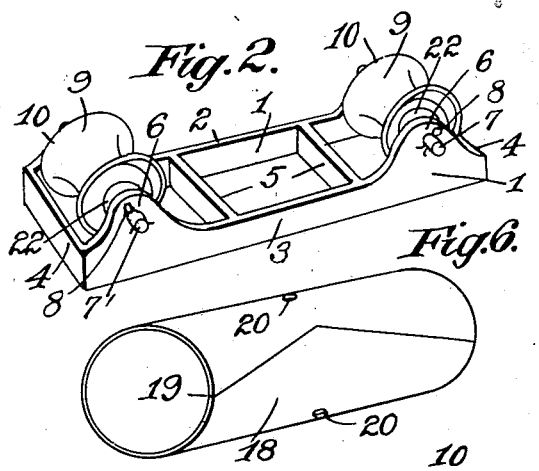
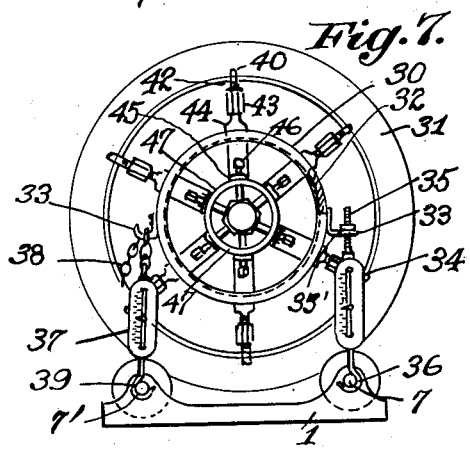
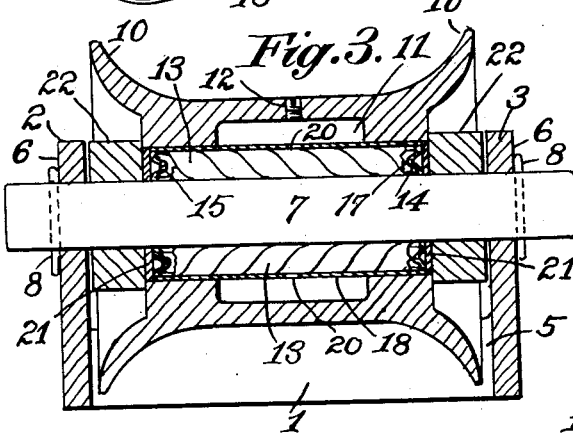
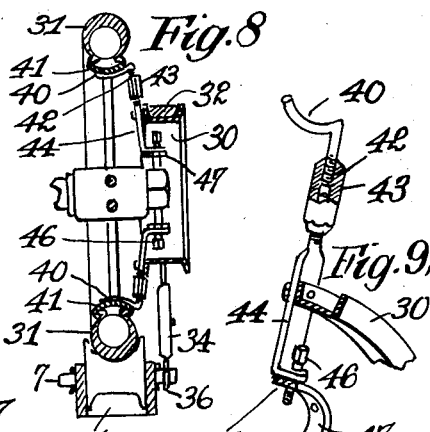
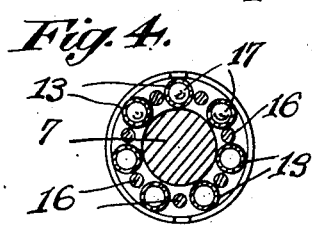
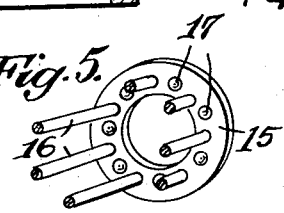
Inventor,
K. B. Harvey.
By his Attorney Patented Apr. 8, 1924.

1,489,434

UNITED STATES PATENT OFFICE.

KELLY B. HARVEY, OF NEW YORK, N. Y.

POWER-TESTING DEVICE FOR MOTOR VEHICLES.

Application filed August 1, 1921. Serial No. 489,064.

*To all whom it may concern:*

Be it known that I, KELLY B. HARVEY, a citizen of the United States, and a resident of New York city, in the county of New York and State of New York, have invented certain new and useful Improvements in Power-Testing Devices for Motor Vehicles, of which the following is a specification.

The object of the present invention is to provide an improved form of apparatus or device for testing the power of a motor in any location, and is especially designed to test the driving power of a motor vehicle.

A further object of the invention is to provide means for readily applying the device to one of the driving wheels of a motor vehicle, and in connection with the same to provide a running support for such wheel that will operate similar to the road conditions.

Another object of the invention is to provide a special form of friction band in a power brake or test device.

In the accompanying drawing showing one embodiment of my invention, Figure 1 shows the device in the position for use on a motor car.

Fig. 2 shows the base member.

Fig. 3 is a section enlarged through one roller.

Fig. 4 is a view showing the cage and shaft.

Fig. 5 shows a detail of the cage.

Fig. 6 shows a lining sleeve for the roller.

Fig. 7 is a view enlarged showing the device attached to a driving wheel.

Fig. 8 is a vertical section through the latter view.

Fig. 9 is a detail enlarged of the brake device.

As shown in the drawing, the power-testing device is formed of two essential members, a drum with securing means to fasten to the wheel, and a curved band passing part way around the wheel with indicating means to show the load or draft on the band by the drum.

I provide a suitable base member, indicated generally by 1, and a drum 30 is suitably secured to the wheel 31 to rotate therewith. A semi-circular band 32, is provided to engage this drum, usually made of metal, and which band is preferably made of wood and find the best results are obtained by using dog wood. This band has brackets 33, 33, at its extremities that connect with the indicating means. As shown I provide a spring scale 34 having at its upper end a threaded bolt 35, adjusted in the bracket 33, by adjusting nut 35'. The lower end of the spring scale has its hook 36 secured to a suitable part of the base, as by a pin or shaft 7. On the other side I provide a similar spring scale 37 having a chain 38 attached to its upper end that engages the hook bracket 33 being adjustable thereby. The lower end of this spring scale has a hook 39 secured at a suitable part of the base 1, as by a pin or shaft 7'. The drum 30 may be secured to the wheel by means of a set of radial members each of which comprises a shoe 40 curved to engage the inner face of the rim 41 of the wheel, which shoe may be lined of rubber if desired. The shoe carries a thread stem 42 engaging a nut 43. A bar 44 has its thread end engaging said nut, which are reverse threads whereby turning the nut will shift the bar relative to the shoe. The bar 44 has its end 45 bent at 45 containing a threaded aperture for a bolt 46. A ring 47 surrounds the hub of the vehicle and has threaded apertures to engage the bolts 46. Six of these radial bars and connecting members are shown on the drum 30 as secured to the six bars as shown. In attaching the drum the ring 47 is mounted on the hub and is secured by the bolts 46. Then the shoes 40 are brought against the tire rim and the nuts 43 turned to force the shoes outwardly and thereby securely clamp the drum to the wheel. The two spring scale members are applied and the dog wood band with proper adjustments by the bolt 35 and chain 38 as indicated in Fig. 7, whereby the proper tension is imparted to the springs. The wheel 31 is suitably supported to be freed from the ground or floor preferably by means hereinafter set forth. Upon driving the wheel the drum 30 will rotate and have a friction bearing on the dog wood band 32 and this will increase the tension on one spring and decrease the tension on the other, according to the direction of rotation. The difference between the readings will give a certain factor to be used in the well-known formulas for computing the brake horsepower.

In connection with this power indicating means I provide a roller support for the driving wheel 31, in the base 1. As shown, the frame is formed of metal preferably a single casting, comprising side bars 2 and 3, end bars, 4, 4, and cross bars 5, 5, connecting the side bars. The side bars have projecting portions 6, 6, at each end suitably apertured to receive rods or shafts 7, 7′, that project beyond the side to receive cotter pins 8. These rods do not rotate but the rollers are rotatable thereon.

I provide a roller 9 having flanged portions 10 at each end, that has a bore considerably larger than the rod 7, and which also has an annular chamber 11 in the bore, at the middle portion to form an oil receptacle, access being had by an opening closed by a screw 12. Between the rod 7 on the roller I arrange a series of roller bearings, in the form of rollers 13. Each of these may be formed by a bar of square or rectangular section bent to form a spiral tube.

I also provide a kind of cage, formed of flat rings, 14, 15, connected by rods 16, secured to the rings, which rings have a series of bosses 17 pressed inwardly between the rods to enter the bores of the spiral rollers, see Fig. 5. It is to be understood that the flat rings are spaced a sufficient distance to receive these rollers on the bosses, that project a short distance only into the rollers and the rods 16 passed between the rollers that are suitably spaced by the location of the bosses 17. These will form a roller bearing between the shaft 7 and the bore of the roller 9, but preferably a race tube 18 is provided that may be split at 19 as shown, and is of hardened steel or metal to prevent wear.

This race is a tight fit in the bore of the roller 9, and engages the rollers 13 of the roller bearing. Suitable apertures 20 are provided in the sleeve 18 for the lubricant to pass in between the spiral rollers. The latter have their spirals extending in alternate directions to cause proper distribution of the oil and keep them lubricated at all times. A washer 21 is arranged at each end of the bore of the roller and secured in position between the shaft and the roller, to hold the cage with its roller bearing in proper position and prevent escape of the lubricant. A spacing collar 22 is also shown at each end of the rollers, between it and the side bar.

It is to be understood that a duplicate of this roller support is arranged for the opposite driving wheel, without the employment of the brake device. The spring scales can engage any part of the frame, preferably the shafts 7 for the two rollers as shown.

It will thus be seen that the rear wheels are supported on the rollers 9 that have the middle portion substantially cylindrical with the flange portion 10 curved outwardly and this corresponds to the contour of the rubber tire where it engages the road under running conditions. The motor of the car can be driven at any desired speed, and the horse-power determined by the means set forth. The use of the supporting members serves to permit the motor vehicle to be operated while stationary and any of its working parts and thus the engine can be adjusted and various parts of the car inspected and adjusted during operation.

I claim—

1. A power-testing device comprising a rotatable member, and a fixed member frictionally engaging the rotatable member, and provided with a friction surface, and means for connecting the device to a wheel of a motor vehicle by engagement with the hub and inner face of the wheel rim.

2. A power-testing device comprising a rotatable member, and a fixed member frictionally engaging the rotatable member, and provided with a friction surface, means for connecting the device to a wheel of a motor vehicle by engagement with the hub and inner face of the wheel rim, and a supporting device for the wheel comprising a base and a pair of rollers adapted to receive the tire.

3. A power-testing device comprising a rotatable member, and a fixed member frictionally engaging the rotatable member, and provided with a friction surface, means for connecting the device to a wheel of a motor vehicle by engagement with the hub and inner face of the wheel rim, and a supporting device for the wheel comprising a base and a pair of rollers adapted to receive the tire which rollers have a middle cylindrical portion with curved flanges at the sides.

4. A power-testing device comprising a rotatable member, and a fixed member frictionally engaging the rotatable member, and provided with a friction surface, means for connecting the device to a wheel of a motor vehicle by engagement with the hub and inner face of the wheel rim, a supporting device for the wheel comprising a base and a pair of rollers adapted to receive the tire which rollers have a middle cylindrical portion with curved flanges at the sides, and a roller bearing for each roller.

5. A device of the character set forth, comprising a base, a pair of grooved rolls on the base adapted to receive the tire of the vehicle, a friction drum, means to secure the drum to the wheel, a friction band passing half way around the drum, and a connecting member between each end of the base and each end of the band.

6. A device of the character set forth, comprising a base, a pair of grooved rolls on the base adapted to receive the tire of the vehicle, a friction drum, means to secure the drum to the wheel, a friction band passing half way around the drum, a connecting member between each end of the base and each end of the band, and adjusting means in one of said connections.

7. A device of the character set forth, comprising a base, a pair of grooved rolls on the base adapted to receive the tire of the vehicle, a friction drum, means to secure the drum to the wheel, a friction band passing half way around the drum, a connecting member between each end of the base and each end of the band, and a spring balance in one of said connections with adjusting means to vary the tension.

8. A device of the character set forth, comprising a base, a pair of grooved rolls on the base adapted to receive the tire of the vehicle, a friction drum, means to secure the drum to the wheel, a friction band passing half way around the drum, a connecting member between each end of the base and each end of the band, a spring balance in one of said connections with adjusting means to vary the tension, and a spring balance in the other connection.

9. A device of the character set forth, comprising a base, a pair of grooved rolls on the base adapted to receive the tire of the vehicle, a friction drum, means to secure the drum to the wheel, a friction band passing half way around the drum, a connecting member between each end of the base and each end of the band, a spring balance in one of said connections with adjusting means to vary the tension, and a spring balance in the other connection, said friction band being formed of dog wood.

10. In a device of the character set forth, a friction drum, a series of radial connecting means on the drum, each comprising a curved shoe to engage the inner face of the rim and lined with rubber, a threaded stem on the shoe, a threaded rod, a nut engaging said bar and stem by reverse threads for adjustment, said bar having its inner end bent and containing threaded apertures, a bolt in each said aperture of the bar end to engage the hub of the wheel, a ring secured on said bolts, and a friction band carried by said bars.

11. In a device of the character set forth, a friction drum, a series of radial connecting means on the drum, each comprising a curved shoe to engage the inner face of the rim, a threaded stem on the shoe, a threaded rod, a nut engaging said bar and stem by reverse threads for adjustment, said bar having its inner end bent and containing threaded apertures, a bolt in each said aperture of the bar end to engage the hub of the wheel, a ring secured on said bolts, and a friction band carried by said bars.

12. An auto wheel running support, comprising a pair of members one for each wheel, each member consisting of an elongated frame, and a pair of grooved rollers each rotatably mounted at one end portion of the frame and spaced apart sufficient to receive the auto wheel, whereby the auto wheels can be driven by the motor without moving the vehicle, said frame comprising a pair of side members with integral end members and braces, the side members having journal portions for the shafts of the rollers.

13. An auto wheel running support, comprising a pair of members one for each wheel, each member consisting of an elongated frame, and a pair of grooved rollers each rotatably mounted at one end portion of the frame and spaced apart sufficient to receive the auto wheel, whereby the auto wheels can be driven by the motor without moving the vehicle, said frame comprising a pair of side members with integral end members and braces, the side members forming supports for the shafts of the rollers, each roller having a roller-bearing on the shaft in the form of a spiral and a closed oil chamber in the roller for said spiral bearings.

14. An auto wheel running support, comprising a pair of members one for each wheel, each member consisting of an elongated frame, and a pair of grooved rollers rotatably mounted one at each end portion of the frame and spaced apart sufficient to receive the auto wheel and support the vehicle whereby the auto wheels can be driven by the motor without moving the vehicle, each roller having a substantially cylindrical intermediate portion and curved out at the flanged end portions, to correspond to the tire at the engaging portions as compressed under load.

Signed at New York city, N. Y., on July 29th, 1921.

KELLY B. HARVEY.